United States Patent Office 2,870,910
Patented Jan. 27, 1959

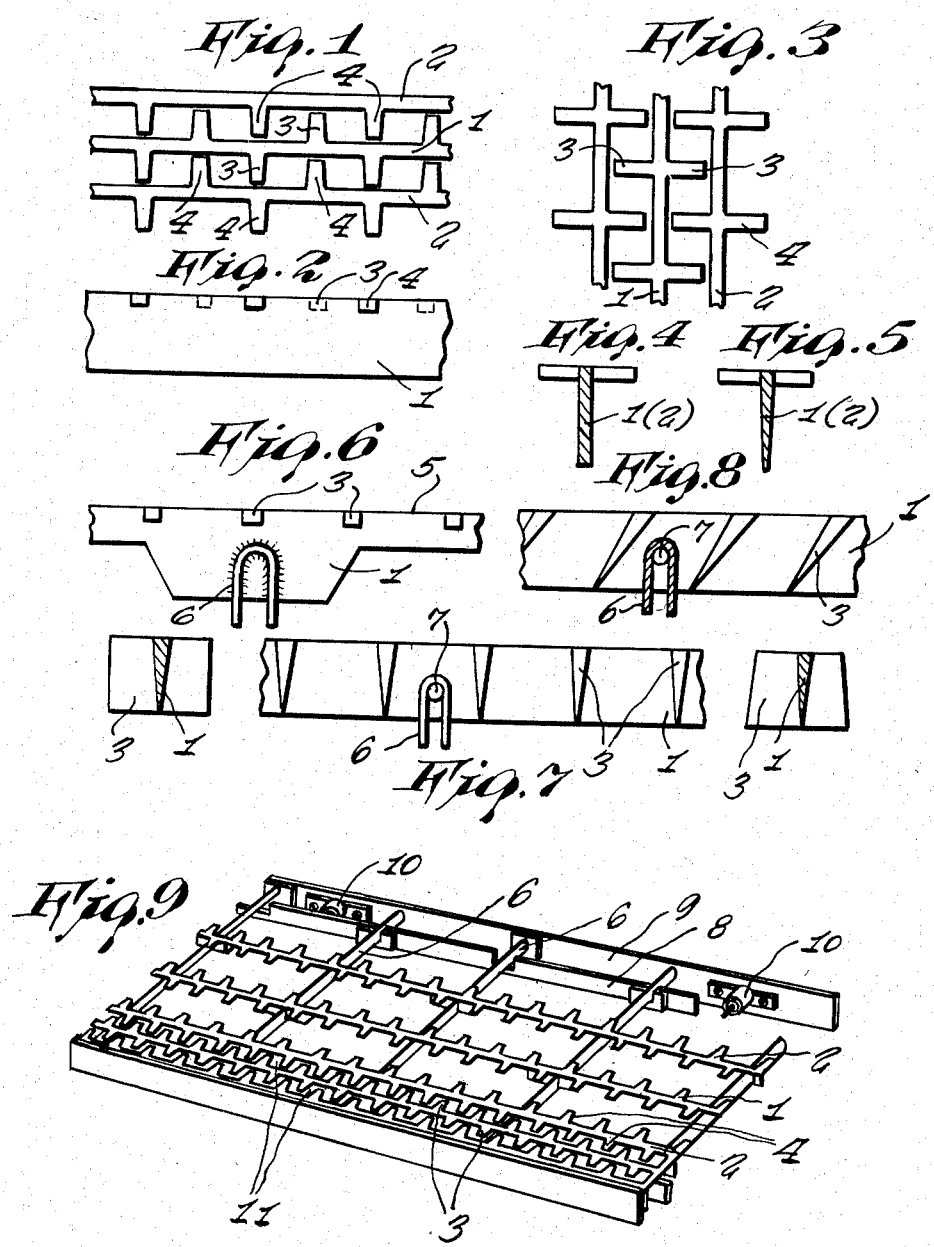

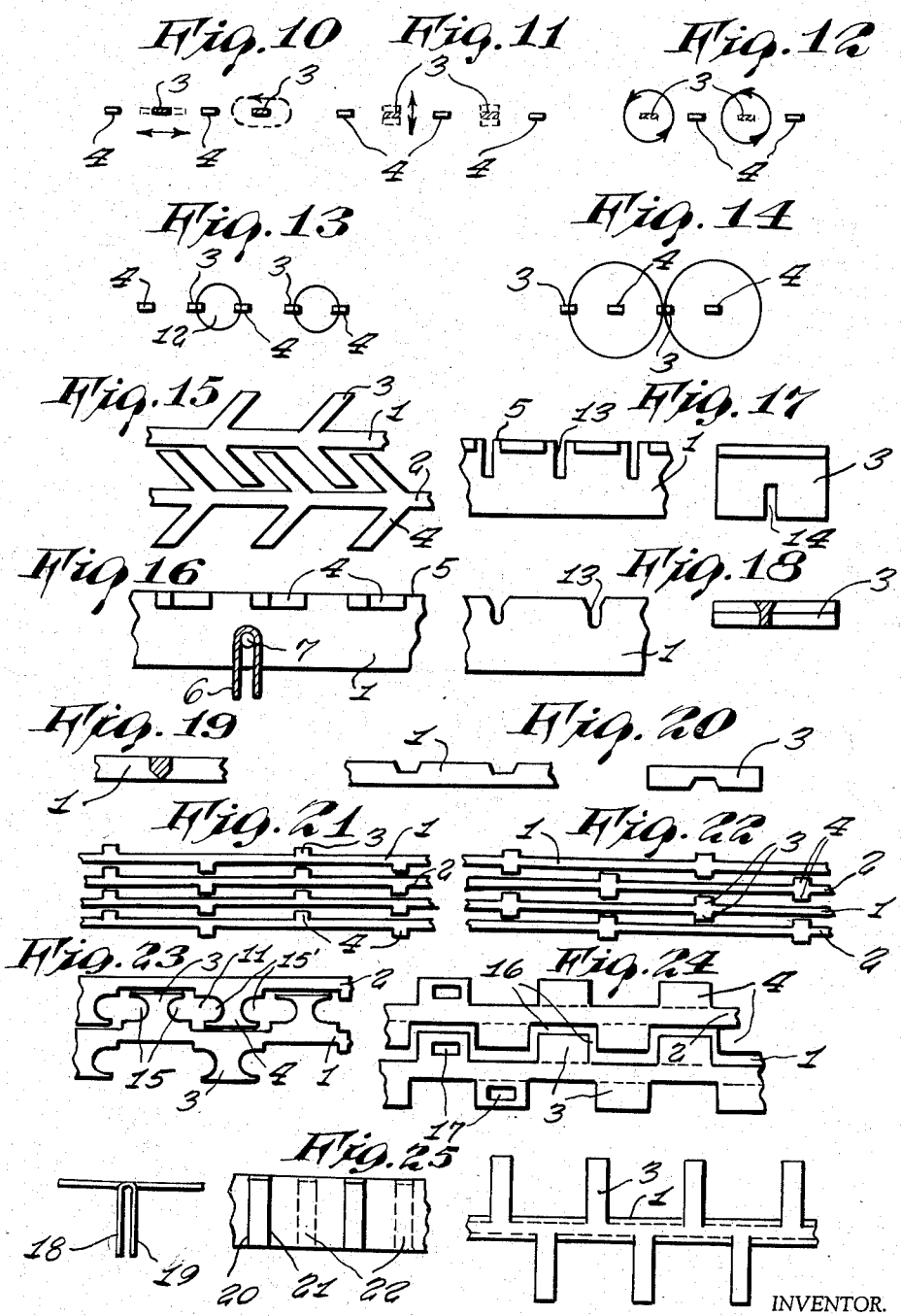

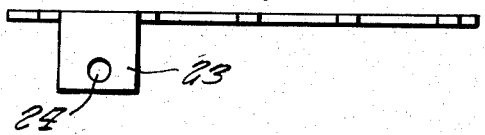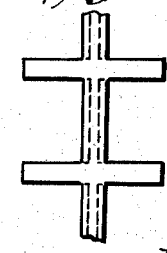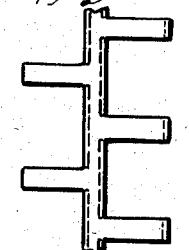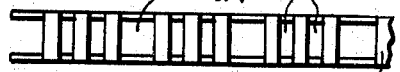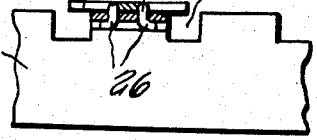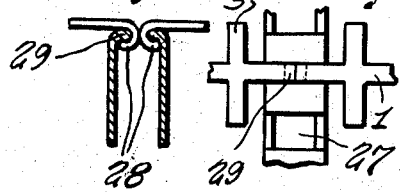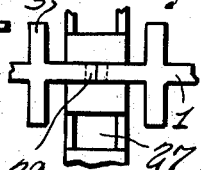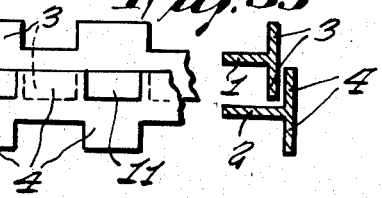

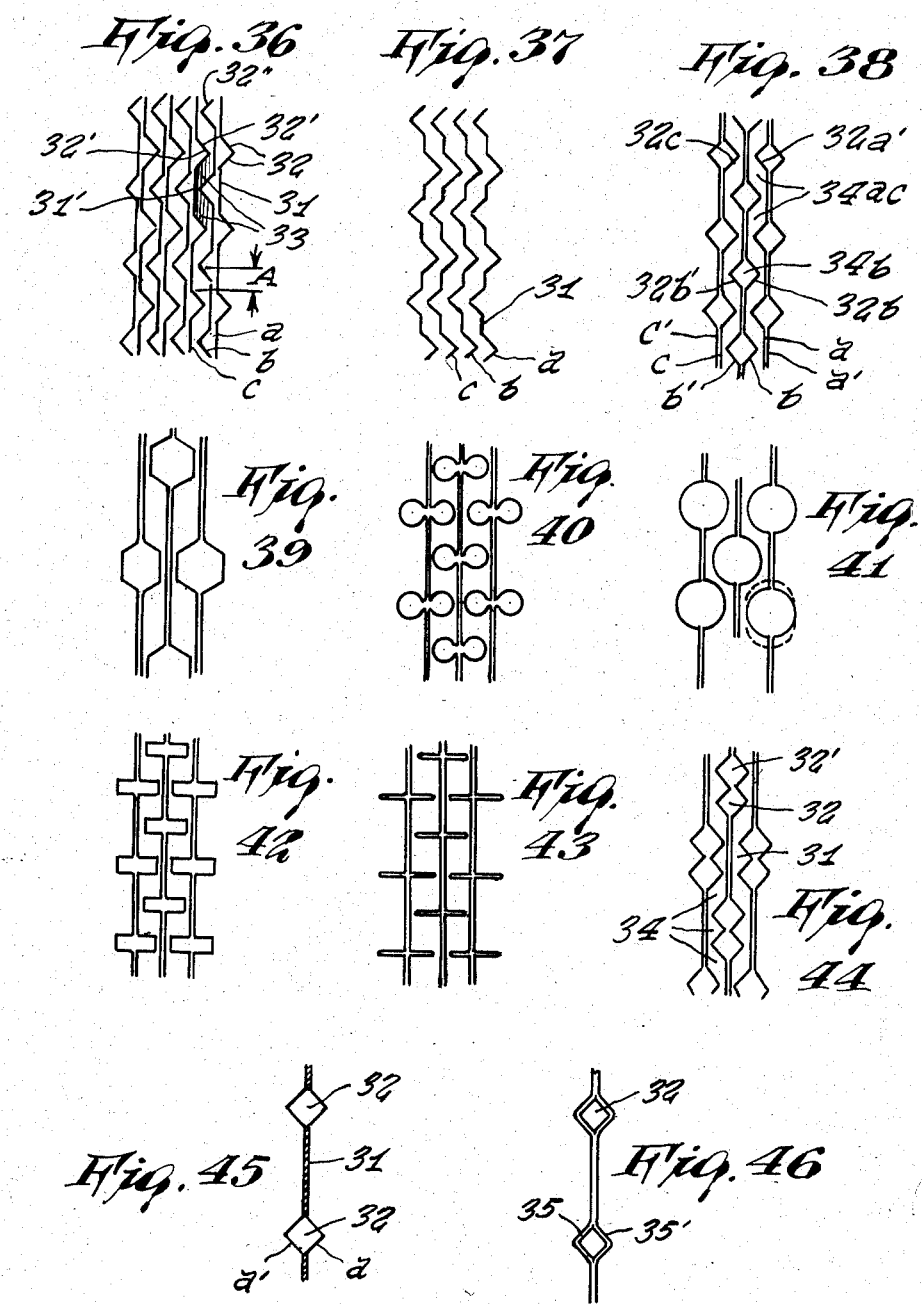

2,870,910

SCREEN FOR USE IN OSCILLATING SCREENING DEVICES

Albert Wehner, Neuss am Rhine, Germany, assignor to Brueckenbau Flender G. m. b. H., Dusseldorf, Germany, a company with limited liabilities Application March 15, 1954, Serial No. 416,318

3 Claims. (Cl. 209—396)

The invention relates to oscillating screens and sieves; it particularly relates to oscillating screens and sieves provided with adjacently spaced bars being preferably on both sides, provided with lateral projections.

It is an essential object of the invention to impart to screens and sieves of the above mentioned type a high grade of self-cleaning efficiency.

It is a further object of the invention to create a possibly large screening surface and to improve the screen openings, in such a manner that a satisfactory grain classification of the materials to be screened is attained even in those cases where these materials are interspersed with rod-shaped pieces, such as wood fibers.

The customary screens and sieves do not satisfy the above mentioned objects. Even if, for instance, perforated sheet metal screens have certain advantages with regard to durability, simplicity of constructions, shape-resistance of their openings and perforations they possess the disadvantage of having a restricted open screen surface and, above all, they are rigid and therefore not self-cleaning.

The situation with known fabric screens is different. Here the shape of the screen openings is changeable to a certain extent and the open screen surface is relatively large; on the other hand, their self-cleaning ability, their resistance to wear and the loading capacity of these fabric screens is insufficient.

The known perforated screens consisting of adjacent profiled bars have the disadvantage of a poor classification of the charged materials and, in particular, cannot be used to screen rod-shaped materials.

Screens are known which consist of profiled rods provided with short lateral extensions the latter being oppositely located to each other and acting as distance pieces. Such screens, however, are extremely stiff and rigid; moreover, stoppages, which considerably interfere with the output of the screen, are the rule with these screens.

It is the main object of this invention to eliminate the above recited disadvantages and drawbacks of the customary screen types.

With this purpose in view bar-shaped screen members are used in conformity with this invention and the same are provided with transverse projections or lateral extensions which are disposed in such a manner that the projections or lateral extensions of one screen member engage between the lateral extensions of the adjacent screen members; the screen members are alternatingly mounted in two mutually movable frame members which are located on oscillating links, rods, springs or the like and connected in such a manner that they move parallel to each other during their oscillation.

These screen members may be used in the form of profiled bars and the two frame forming members may be mounted and driven by suitably arranged crank shafts in such a manner that the lateral extensions of two adjacent profile bars and therefore of different frames are movable about a common axis of rotation, or that the lateral extensions of the one frame move around those of the other frame. The screen elements may, however, also be constructed in the form of wires provided with lateral bends situated in the plane of the screen, the wires being so arranged, either individually or in pairs, that their bent portions project into the bent portions of adjacent wires or pairs of wires.

The invention will now be described more in detail and with reference to the accompanying drawings, wherein:

Figs. 1 and 2 are a top view and a corresponding side view of a portion of the screen;

Fig. 3 is a plan view of a modification of the same;

Figs. 4 and 5 are cross sectional views of the longitudinal screen members or bars;

Figs. 6, 7 and 8 are lateral views of further embodiments of the longitudinal screen members or bars and their lateral extensions;

Fig. 9 is a perspective view of the complete screen comprised of oscillating screen systems with portions omitted for clarity of presentation;

Figs. 10–14 are diagrammatic views illustrating various possibilities of oscillating the screen shown in Fig. 9;

Figs. 15 and 16 are a plan view and a side elevation of screen bars of the herring-bone type;

Figs. 17 to 20 show various means of fastening the lateral extensions to the longitudinal screen bars;

Figs. 21 to 34 are plan views, side views and cross sections of further embodiments of the screen bars;

Fig. 35 shows a plan and a cross sectional view of an embodiment of the invention where the lateral extensions of the longitudinal screen bars partly overlap; and Figs. 36 to 46 illustrate plan views of the longitudinal screen bars made of wire.

The screen of which only a portion is shown in Figs. 1 and 2 consists of a plurality of adjacent longitudinal bars 1, 2, which are spacedly placed side by side and lateral extensions 3, 4. These lateral extensions or projections 3, 4 are preferably provided on opposite sides of the longitudinal bars 1, 2 the lateral extensions being staggered relative to each other in such a manner that the lateral extensions 3 of the longitudinal bar 1 enter between the lateral extensions 4 of the longitudinal bars 2.

In the example shown in Fig. 3 the lateral extensions 3 and 4 provided on both sides of the bars 1, 2 extend in the same direction but are not staggered.

The lateral extensions may be positioned along the upper edge portion 5 of the longitudinal bars 1 and 2, as apparent from Fig. 6, or they may extend over the entire height of the bars 1, 2, as shown in Fig. 7; in the latter case the lateral extensions 3, 4 may have a downwardly tapering wedge-like shape.

The lateral extensions 3, 4 need not extend in a vertical direction and may be inclined at an angle, as shown in Fig. 8.

As apparent from Fig. 9 the screen has two frame members 8, 9 and the longitudinal bars 1, 2 may be connected to these outer frame members 8, 9 by U-shaped rails 6, 6' which are either welded to the bars 1, 2 or are connected therewith by means of a transversely tensioned wire 7, Figs. 7, 8, which is connected with the outer of the screen frame members.

As apparent from Fig. 9, showing the entire screen including its outer frame structure the longitudinal bars 1, 2 are mounted by means of the rails 6, 6' in two movable frame members or bars 8, 9; the latter are connected with each other by oscillating means, such as the oscillating members 10, in such a manner that the interstices 11 enclosed by the adjacent longitudinal bars 1, 2 and their lateral extensions 3, 4 are periodically changed with regard to size and shape. In this manner a highly welcome self-cleaning action is attained, and work interruption due to clogging of the screen passages is prevented.

The two frame bars 8, 9 may be mounted and driven in such a manner that the interengaging lateral extensions 3, 4 carry out the movements diagrammatically illustrated in Figs. 10 to 14.

If, for instance, the frame member 9 is stationary and the frame member 8 is oscillatingly movable relative thereto the positional changes shown in Figs. 10 to 12 and 14 may take place whereby the lateral extensions 3 of bar 1 or frame 8 perform either horizontal or elliptical oscillations as indicated by arrows in Fig. 10, or oscillations at a right angle to the place of the screen as indicated by the arrows of Fig. 11.

By the application of suitable driving means the lateral extensions 3 may make circular movements about their position of rest as apparent from Fig. 12 or about the stationary lateral extensions 4, as shown in Fig. 14.

Moreover, the two oscillating frame structures may be mounted and driven in such a manner that, as apparent from Fig. 12, the lateral extensions 3, 4 of the profile bars 1, 2 move about opposite to one another, for example, rotate about a common axis of rotation 12. Screens constructed in this manner not only have a very good self-cleaning action but also effect a transport movement as the materials placed upon the same are carried in the direction of their ejection.

In the embodiment of the invention illustrated in Figs. 15, 16 the lateral extensions 3, 4 extend in an oblique direction relatively to the longitudinal direction of the bars 1, 2 whereby a herring-bone structure results. The screening resistance and therefore also the wear of the lateral extensions is thereby greatly reduced, as the materials to be screened more easily pass along the inclined edges. The herring-bone shaped lateral extensions may be provided at the upper parts of the longitudinal U-bars 1, 2 or they may extend over the entire width of the same.

Figs. 17 to 20 illustrate a recommendable fastening of the lateral extensions 3, 4 to the longitudinal bars 1, 2.

For this purpose, see Fig. 17, the bars 1 may be provided at their upper edge 5 with slots 13, into which the lateral extensions 3 which are provided with corresponding slots 14 at the lower edge, are inserted; thereupon the bars are welded together.

Fig. 18 illustrates the fastening of the lateral extensions 3 on the longitudinal bars 7, the latter being provided with slots 13 corresponding to the wedge shape of the lateral extensions to be inserted into these slots.

Figs. 21 and 22 show longitudinal screen bars 1, 2 with longitudinally extending apertures therebetween into which the lateral extensions 3, 4 project.

In conformity with Fig. 23 the lateral extensions 3, 4 are provided on opposite sides with recesses 15 forming with recesses 15¹ of the adjacent lateral extensions oval openings 11.

The screen forming longitudinal bars 1, 2 illustrated in Fig. 24 have on both sides lateral extensions 3, 4 which are staggered. The width of the lateral extensions 3, 4 is so dimensioned that labyrinthal spaces 16 are formed between the longitudinal bars 1, 2. The screen may be in this manner provided with apertures 16 of a very small width not producible by stamping. It has been found by experience that the cutting tools must have a width which at least equals to the thickness of the sheet to be shaped; however, the remaining material strips must be sufficiently thick to offer a satisfactory supporting quality. The lateral extensions 3, 4 may be provided with recesses 17.

The bars 1, 2 illustrated in Figs. 25, 27, 28 have a U-shaped profile which opens downwardly into two branches 18, 19 the latter being divided by slots 20, 21 into strips 22; these strips after being upwardly bent into a horizontal or substantially horizontal position form the lateral extensions 3, 4. Therefore lateral extensions 3, 4 may be bent into a roof-like shape shown in Fig. 27, or their ends may be downwardly bent, as shown in Fig. 28.

The above described construction of the lateral extensions is particularly advantageous with wide profile bars because, in screen systems oscillating at right angles to the screen surface, the whole width of the bars may be cleaned by the bent-down ends of the lateral extensions.

As shown in Fig. 26, the bars 1 and 2 may also consist of stamped-out strips of sheet metal which strips are provided at intervals with fixing straps 23 having holes 24 for the passage of the rails 6 or 6'. Instead of separate fixing straps, as shown in Figs. 29–32, some of the cross bars 3 and 4 may be downwardly bent and inserted in the supporting rails 6, 6', which are provided with corresponding recesses 25, and fixed therein by round-bending of their ends 26. Recesses 27 in the rails 6 and 6' serve for the free passage of adjacent longitudinal bars 1 and 2.

As apparent from Figs. 33 and 34, the bars 1 and 2 need not extend continuously over the entire length of the screen and they may be fixed by engagement with their downwardly bent ends 28 in slots 29 of rails 6 and 6'.

In the embodiment illustrated in Fig. 35 the bars 1 and 2 are so arranged and their lateral extensions 3, 4 are so constructed that the latter partly overlap. The openings 11 between the bars are therefore covered in one position of the two oscillating systems and are open in the opposite position, as apparent from Fig. 35.

In the screen illustrated in Figs. 36–46, the screen elements are formed by wires provided with bent parts and arranged in accordance with the invention.

Thus the screen shown in Figs. 36 and 37 consist of a number of adjacent wires a, b, c and so forth which alternatingly consist of straight parts 31 and bent parts 32. The bent parts of each of the wires may be provided at one side only, as shown in Fig. 36 or at opposite sides, as shown in Fig. 37.

The bends may be of any desired shape, and may be, for example, triangular, trapezoidal, circular, semi-circular or U-shaped. As apparent from the drawing the screen apertures have a stepped or a wavy shape and cause a continuous confused movement of the material passing over the same; an excellent layer formation and settlement is thereby produced.

The wires are so disposed that their bent portions, for instance 32b, Fig. 38, engage between the bent portions of the adjacent wires a and c. If such wires are associated alternately with one end the other of two interengaging screens parts which perform relative movements with an amplitude A, for example, of half the length of the straight part 31 of the wire, the flanks 32' of the bends, during their swinging movement, pass over the cross-hatched surface 33, Fig. 36. Since the portions 32', 32" of adjacent bands are close together at the points of reversal of the oscillating movements, in the case of materials which are difficult to screen and especially those which cake easily, any crusts tending to form at the bends are removed. Therefore the flanks of the wire bends are self-cleaning in contradistinction to the art.

Whereas in the screens according to Figs. 36 and 37 the wires are staggered in such a manner that their bends engage between those of directly adjacent screen members, in the Figs. 38–44 the wires are arranged in pairs in such a manner that the bends 32b, 32b' of one pair of wires b, b' are located oppositely to each other and enclose small screen meshes 34b, the shape of which does not vary and which are movable in the larger meshes 34a, c defined by the adjacent pair of wires a, a' and c, c' and their bends 32d, 32c.

As shown in Figs. 38 and 43, the bends 32 may be triangular, trapezoidal, circular, semi-circular or U-shaped.

The screen wires shown in Fig. 44 differ from those of Fig. 38 insofar as the wires possess two adjoining bends 32, 32' instead of straight part 31 between the bends. The bends 32, 32' are movable in the larger meshes 34 designed by the adjacent pairs of wires and their bends.

The screen elements illustrated in Figs. 39–43 may also be arranged in the manner shown in Figs. 36 and 44.

Fig. 45 shows an assembly of pairs of wires in accordance with this invention which is particularly suitable for heavy screen constructions. In the form shown in this figure, the straight parts of the wires $a$, $a'$ between the bends 32 are twisted together.

Instead of the assembly of pairs of wires shown in Figs. 38–45, the wires shown in Fig. 46 may be used, these wires being spread apart at the bends 32, and the outwardly spread halves 35, 35' forming the bends.

The constructions illustrated in Figs. 45 and 46 may also be arranged in the manner illustrated in Figs. 36 and 38–44. In this case, also the parallel straight parts of a pair of wires would either be twisted or might have a solid full cross section.

The straight or twisted parts of the wires arranged in pairs may for the purpose of increasing their rigidity be joined by soldering, hard soldering, welding, spot welding, galvanizing and so forth.

Since certain changes may be made in the above invention and different embodiments of the same could be made without departing from the scope thereof, it is intended that all matter contained in the above description or shown in the accompanying drawing shall be interpreted illustrative and not in a limiting sense.

What I claim is:

1. A screen for use in oscillating screening devices, comprising an outer frame and an inner frame, said inner frame defining a screening area, a plurality of longitudinal bars adjacent each other, disposed within the confines of said inner frame each longitudinal bar having lateral extensions spaced from each other and projecting into inter-extension spaces of the longitudinal bars adjacent thereto, said longitudinal bars and extensions extending throughout said area, alternate longitudinal bars defining a first group and being supported for movement in unison relative to the other longitudinal bars defining a second group, said outer frame and said inner frame being reciprocally movable parallel relative to each other in the direction of elongation of said longitudinal bars, each frame supporting transverse rails, the longitudinal bars of said first group being supported by the transverse rails of one of said frames, and the longitudinal bars of the other group by the transverse rails of the other frame, and connecting means interconnecting said frames and operable for guiding one frame parallel relative to the other, said inner frame including said connecting means being disposed entirely within the confines of said outer frame.

2. A screen as claimed in claim 1, said lateral extensions being inclined relative to the direction of said longitudinal bars in a herring-bone like manner.

3. A screen as claimed in claim 1, said lateral extensions having opposite recesses which are shaped to form substantially circular openings.

References Cited in the file of this patent

UNITED STATES PATENTS

| | | |
|---|---|---|
| 626,306 | Seltner | June 6, 1899 |
| 1,553,693 | Jensen | Sept. 15, 1925 |
| 1,703,726 | Davis | Feb. 26, 1929 |
| 1,876,034 | Symons | Sept. 6, 1932 |